No. 703,999. Patented July 8, 1902.
J. CHERPAW & F. McGUIRE.
SHEEP TRAIL.
(Application filed Jan. 29, 1901.)
(No Model.)
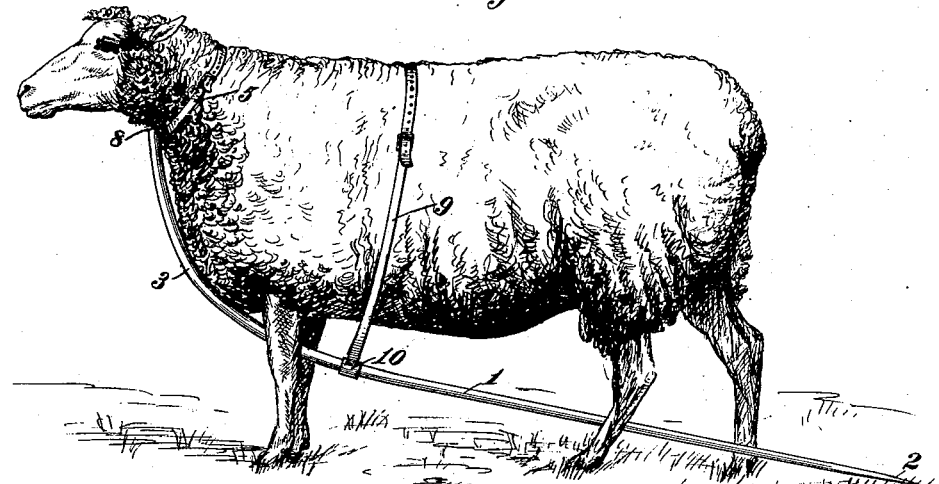
Fig. I.
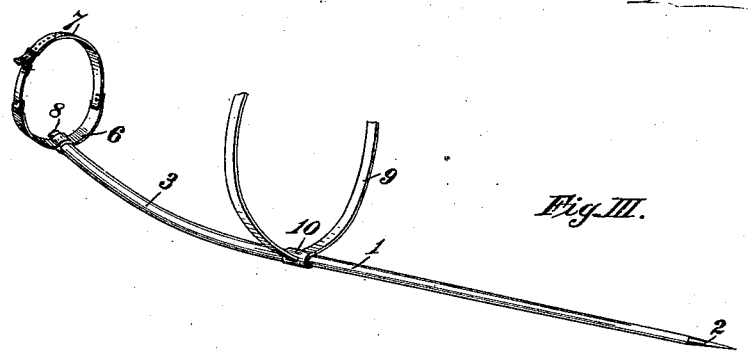
Fig. III.
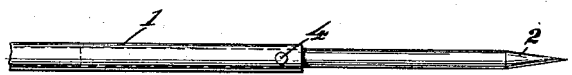
Fig. II.
Witnesses
Inventors:
Joseph Cherpaw
Frederick McGuire
By Knight Bros
Attorneys

UNITED STATES PATENT OFFICE.

JOSEPH CHERPAW AND FREDERICK McGUIRE, OF UXBRIDGE, CANADA.

SHEEP-TRAIL.

SPECIFICATION forming part of Letters Patent No. 703,999, dated July 8, 1902.

Application filed January 29, 1901. Serial No. 45,262. (No model.)

*To all whom it may concern:*

Be it known that we, JOSEPH CHERPAW and FREDERICK McGUIRE, subjects of the King of Great Britain and Ireland, residing at Uxbridge, in the county and Province of Ontario, Dominion of Canada, have invented certain new and useful Improvements in Sheep-Trails, of which the following is a specification.

Referring to the drawings, Figure 1 is a view of our improved sheep-trail as applied to the animal. Fig. 2 is a view of a modification in which we employ a tubular bar with an extensible portion thereto, the lower portion only of said bar being shown. Fig. 3 is a perspective view of the trail, showing the curvature of the bar and a portion of one of the straps being removed.

The object of our invention is to provide an improved device which will be inexpensive, of simple construction, light, strong, durable, easily adjusted, and not liable to get out of order, to keep rams while running together from fighting, to prevent sheep from jumping fences, to keep lambs from rubbing off their foretops, and for other purposes obvious to those skilled in sheep-raising.

In the construction of our improved sheep-trail we employ a bar 1, pointed at one end at 2 and curved at the upper end, if desired, as shown in Figs. 1 and 3, as at 3, to conform to the breast of the animal. The bar 1 may also be tubular and adjustable, as shown in Fig. 2, in which case we make the same in the form of a tube, with the point 2 slidably adjusted therein by means of the set-screw 4.

5 is a collar suitably secured to the upper end of bar 1. The collar 5 may be made of any suitable material and in any suitable manner. We prefer to make the same in two parts, one part, 6, a half-circle of metal or stiff leather and the other part, 7, comprising an adjusting-strap. The end 8 of the bar 1 projects to a slight extent beyond the collar 5, so as to press against the neck of the animal. In addition to the collar 5 for strapping the trail to the animal we employ a strap 9, secured to the bar 1 at 10.

In the use of our improved trail the bar 1 is passed between the fore legs of the animal, the sharpened end 2 dragging on the ground and the other end 8 being supported by the collar 5, fastened about the animal's neck. The bar 1 is kept in position by means of the strap 9, which passes over the animal's back behind the fore legs.

It will be readily seen from the foregoing arrangement that it will be impossible for the animal to rub its foretop against a tree, fence, or other obstacle or to back up in order to jump a fence or bunt without the pointed end 2 of the bar 1 engaging the ground and forcing the end 8 of the bar 1 into the throat of the animal, which will be either choked or thrown. The use of the semicircular piece 6 of the collar 5 prevents injury to the animal's neck.

As already pointed out, the length of the bar 1 may be varied by employing the construction shown in Fig. 2, and the curve 3 on the bar 1 may be made of any degree, so as to be applied to animals of different sizes.

Having thus described our invention, what we claim as new therein, and desire to secure by Letters Patent, is—

1. In a sheep-trail, the combination of a bar pointed at its lower end and curved at its upper end, to conform to the breast of the animal, of a collar secured to said bar near its upper end and by means of which said bar is secured to the animal, and means whereby said bar is held in position, said bar adapted to extend rearwardly and to grip the animal's neck when its pointed end engages the ground.

2. In a sheep-trail, the combination of an extensible bar, of a strap secured to said bar near its central portion, for holding said bar in place, and a collar comprising an adjusting-strap and a semicircular portion of resilient material whereby the upper end of said bar may grip the animal's neck without injury to the animal.

3. In a sheep-trail, the combination of a tubular bar curved at its upper end, a pointed bar adapted to slide within said tubular bar, a set-screw seated in said tubular bar, said set-screw bearing against said pointed bar and holding the same in adjustment; of a strap secured to said tubular bar for holding said tubular bar in place and a collar secured to said tubular bar near the upper end thereof, said collar comprising an adjusting-strap and a semicircular portion of resilient material, whereby the upper end of said tubular bar may grip the animal's neck without injury to the animal.

Dated at the town of Uxbridge, in the county and Province of Ontario, this 7th day of January, A. D. 1901.

JOSEPH CHERPAW.
FRED. McGUIRE.

Witnesses:
J. W. KIMMERLY,
S. S. SHARPE.